June 12, 1962  G. A. JONES  3,038,351
CLUTCH AND TRANSMISSION ASSEMBLY
Filed June 28, 1960  2 Sheets-Sheet 1

INVENTOR.
GILBERT A. JONES

June 12, 1962            G. A. JONES            3,038,351
CLUTCH AND TRANSMISSION ASSEMBLY
Filed June 28, 1960                                2 Sheets-Sheet 2
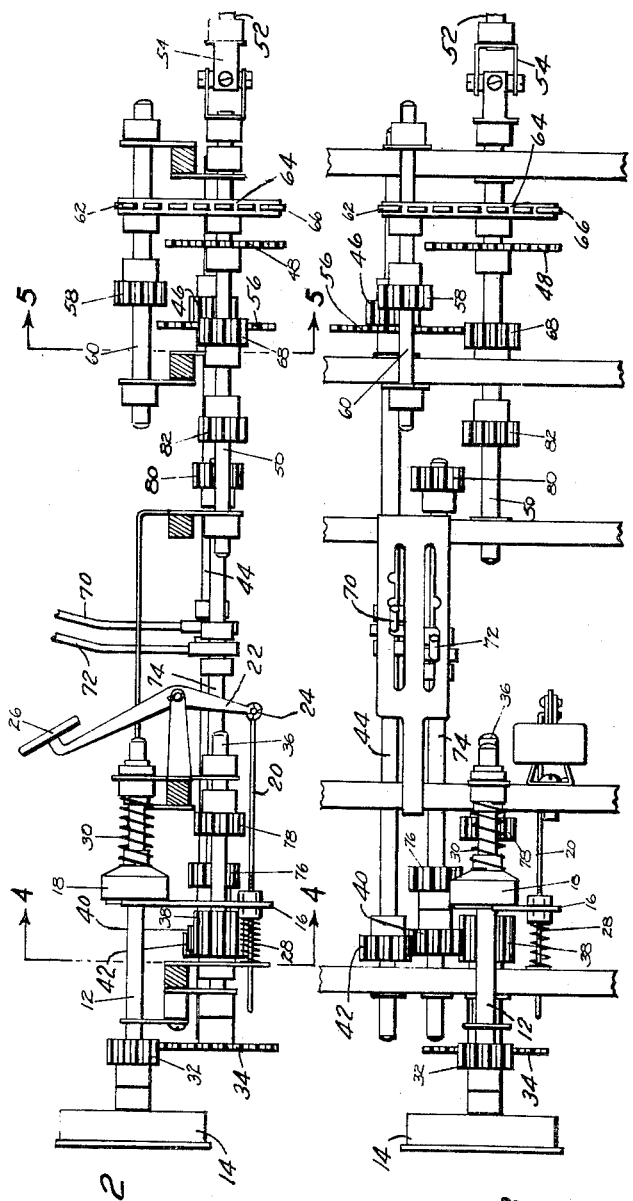
INVENTOR.
GILBERT A. JONES
BY 3,038,351
CLUTCH AND TRANSMISSION ASSEMBLY
Gilbert A. Jones, 11 Independence Place, Ossining, N.Y.
Filed June 28, 1960, Ser. No. 39,340
4 Claims. (Cl. 74—342)

This invention relates to power transmission systems and more particularly to a clutch and transmission assembly for miniature engines and electric motors.

It is an object of the present invention to provide a clutch and transmission assembly that is especially designed for miniature engines and electric motors having three-fold speeds and a reverse gear of a ratio equivalent to the second gear of the forward directional speed, thereby providing a substantial range of reduced engine to vehicle-drive-wheel ratios.

Another object of the instant invention is the provision of a clutch and transmission assembly for utilization within miniature gasoline powered or electrically powered vehicles to thus render such vehicles operational in confined areas and/or hilly terrain by virtue of the reduced engine to vehicle-drive-wheel ratios.

Still another object of the present invention is to provide a clutch and transmission assembly of the above type which can be carefully and accurately controlled, and which can be readily adapted for all types of miniature and scale model vehicles.

Other objects of the invention are to provide a clutch and transmission assembly bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawings, in which:

FIGURE 2 is a side elevation view of the clutch and transmission assembly shown in perspective in FIGURE 1.

FIGURE 3 is a plan view of the clutch and transmission assembly shown in perspective in FIGURE 1.

FIGURE 4 is a section on the line 4—4 of FIGURE 2 showing the lateral relationship among the speed ratio, directional and idler shafts and the position of the input shaft, clutch pedal and gear shift levers.

FIGURE 5 is a section taken on the line 5—5 of FIGURE 2 showing the linkage between the sprocket wheel on the idler shaft and the gear speed wheel on the output shaft.

Figure 1:
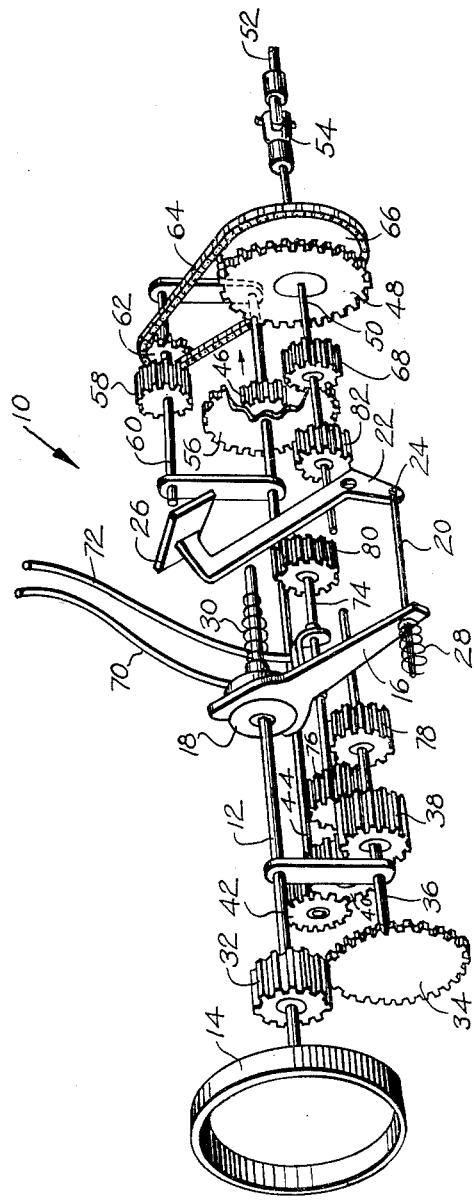
FIGURE 1 is a perspective view of a clutch and transmission assembly made in accordance with the present invention.

Referring now more in detail to the drawing, a clutch and transmission assembly 10 made in accordance with the present invention is shown to include an input shaft 12 having a clutch plate 14 mounted at one forward end for selective engagement with a cooperating clutch plate secured to the drive shaft of the engine. The clutch plate 14 is controlled by a forked arm 16 that is engaged with a bushing 18 rotatably mounted upon the input shaft 12, but secured thereupon against relative longitudinal movement. A tie rod 20, pivotally mounted by means of a pin 24 at one end of a bell crank lever 22, is controlled by a clutch pedal 26 through a compression coil spring 28 acting between the free end of the tie rod 20 and the free end of the lever 16. Another compression coil spring 30 encircling the free end of the input shaft 12, serves to continuously urge the clutch plate 14 toward engaged position, thus normally maintaining the clutch pedal 26 in a normally upwardly extended position. However, by depressing the clutch pedal 26, the aforementioned linkage will cause retraction of the input shaft 12 to disengage the clutch plate 14.

A drive pinion 32 is secured upon the input shaft 12 and is in constant meshing engagement with a gear wheel 34 secured to an idler shaft 36. A drive pinion 40, secured upon a directional gear shaft 74, normally transmits power from the gear pinion 38 to a corresponding drive pinion 42 secured upon a speed ratio shaft 44 having a first speed drive gear 46 secured thereupon at its opposite end for movement relative to a complementary first gear speed wheel 48 mounted upon the output shaft 50 of the system. This output shaft 50, is coupled by means of a universal coupling 54 to the actual drive shaft 52 of the vehicle upon which the system is mounted.

A second and third gear wheel 56 secured to the speed ratio shaft 44 is also movable longitudinally relative to longitudinally displaced second and third gear drive pinions 58, 68. The second gear drive pinion 58 is mounted upon an idler shaft 60 having a sprocket wheel 62 meshingly engaged with a drive sprocket 64 that is also trained about a drive sprocket wheel 66 mounted upon the output shaft 50. The third speed gear pinion 68 is secured to the output shaft 50. It will thus be recognized that by adjusting the position of a gear shift lever 70 secured to the speed ratio shaft 44, power transmitted from the idler shaft 36 to the speed ratio shaft 44 may be selectively transmitted through any one of the first, second, and third speed gears 46, 48; 56, 58; 56, 68; respectively.

Another gear shift lever 72 is secured to the directional gear shaft 74 upon which the forward gear pinion 40, and a pair of reverse gear pins 76, 80 are secured. In the extreme forward position of the lever 72 and directional shaft 74, the forward speed pinion 40 serves to transmit power directly between the pinion 38 of the idler shaft 36 and the pinion 42 of the speed ratio shaft 44. In a centered position, the reverse gear 76 is operative to transmit power from the reverse gear 78 to the pinion 76 and the drive pinion 42 of the speed ratio shaft 44, provided that the drive gear 42 is in a completely rearward position. In the event that the pinion 42 has not shifted to the rear first gear position, a centered position of the directional shaft 74 places the system in a neutral arrangement. Furthermore, when the second lever 72 is completely extended to the rearwardmost position, the reverse gear 80 will engage its complementary gear 82 mounted upon the output shaft 50, thus driving the output shaft 50 directly from the idler shaft 36, thus reversing the direction of rotation of the output shaft 50.

Each lever 70, 72 has three positions. The lever 70 is placed in a selected one of the forward, centered, and rearward positions for first, second, and third speeds, respectively. The second lever 72 is placed forwardly for first gear, centered for second gear, and is placed forward again for third gear. For reverse, the first lever 70 is placed forward while the second lever 72 is placed rearward. For neutral, the first lever 70 is placed forward while the second lever 72 is centered; or the second lever 72 is placed forward and the first lever 70 is centered.

Consonant with the foregoing and as illustrated in the drawings, the spaced parallelism and relative longitudinal movement among said input shaft 12, output shaft 50, speed ratio shaft 44, directional shaft 74 and idler shafts 36, 60, is afforded by virtue of the standardization of diameters, tooth configurations and central shaft receiving bore sizes of said drive pinion 32, gear pinion 38, drive pinion 40, drive pinion 42, first-speed drive gear 46, second-gear drive pinion 58, third-gear drive pinion 68, reverse gear 78, reverse gear pins 76, 80 and gear 82. Accordingly, it will be appreciated that the standardization of the aforesaid basic gears thus permits an interchange of worn parts thereby promoting uniform wear as well as extending the operational life of the system.

It will now be further appreciated that this extremely compact and efficient system may be readily used for all types of scale model vehicles and for powering small go carts and the like from otherwise high speed motive power sources, such as gasoline engines and electric motors.

While various changes may be made in the detail construction, it shall be understood that such changes shall be within the spirit and scope of the present invention as defined by the appended claims.

What I claim as new and desire to protect by Letters Patent of the United States is:

1. A clutch and transmission assembly comprising, in combination, an input shaft, an output shaft, a speed ratio shaft, an idler shaft and a directional shaft, said shafts being supported in spaced parallel relationship, connection of said input shaft with said speed ratio shaft being controllably effectuated through the intermediate engagement of gear means acting between said directional shaft, said idler shaft and said speed ratio shaft, gear means acting between said speed ratio shaft and said output shaft to control the relative speed of said input and output shafts, means for adjusting the relative positions of each of said speed ratio and directional shafts, and gear means acting between said input shaft, said directional shaft and said output shaft to thereby control the direction of rotation of said output shaft relative to said input shaft.

2. A clutch and transmission assembly comprising in combination, an input shaft, an output shaft, a speed ratio shaft, an idler shaft and a directional shaft, said shafts being supported in spaced parallel relationship, connection of said input shaft with said speed ratio shaft being controllably effectuated through the intermediate engagement of gear means acting between said directional shaft, said idler shaft and said speed ratio shaft, gear means acting between said speed ratio shaft and said output shaft to control the relative speed of said input and output shafts, gear means acting between said input shaft, said directional shaft and said output shaft to control the direction of rotation of said output shaft relative to said input shaft, a pair of gear shift levers each secured to one of said speed ratio and directional shafts whereby the relative positions of said gear means may be controlled.

3. A clutch and transmission assembly comprising in combination, an input shaft having a drive pinion mounted thereon, an idler shaft having a gear-wheel mounted at one end thereof, a directional shaft, a speed ratio shaft having a gear-wheel mounted thereon, and an output shaft having a gear-wheel and a sprocket wheel mounted thereon, said shafts being supported in spaced parallel relationship, said drive pinion and said gear-wheel mounted on said idler shaft being in constant meshing engagement, a plurality of equal-diameter gear-pinions mounted upon each of said idler, directional and speed ratio shafts, connection of said input shaft with said speed ratio shaft being controllably effectuated through selective intermediate engagement of said equal-diameter gear pinions acting between said directional shaft, idler shaft and speed ratio shaft, gear means acting between said speed ratio shaft and said output shaft to control the relative speed of said input and output shafts, said equal-diameter gear pinions being selectively engageable to act between said input, directional, and output shafts to control the direction of rotation of said output shaft relative to said input shaft.

4. A clutch and transmission assembly comprising in combination, an input shaft having a drive pinion mounted thereon, an idler shaft having a gear-wheel mounted at one end thereof, a directional shaft, a speed ratio shaft having a gear-wheel mounted thereon, and an output shaft having a gear-wheel and a sprocket wheel mounted thereon, said shafts being supported in spaced parallel relationship, said drive pinion and said gear-wheel mounted on said idler shaft being in constant meshing engagement, a plurality of equal-diameter gear-pinions mounted upon each of said idler, directional and speed ratio shafts, connection of said input shaft with said speed ratio shaft being controllably effectuated through selective intermediate engagement of said equal-diameter gear pinions acting between said directional shaft, idler shaft and speed ratio shaft, gear means acting between said speed ratio shaft and said output shaft to control the relative speed of said input and output shafts, said equal-diameter gear-pinions being selectively engageable to act between said input, directional, and output shafts to control the direction of rotation of said output shaft relative to said input shaft and a pair of gear shift levers each secured to one of said speed ratio and directional shafts whereby the relative positions of the equal-diameter gear-pinions mounted on said speed ratio and directional shafts may be controlled.

References Cited in the file of this patent

UNITED STATES PATENTS

| | | |
|---|---|---|
| 728,268 | Miller | May 19, 1903 |
| 775,503 | Soames et al. | Nov. 22, 1904 |
| 2,145,979 | Friedman | Feb. 7, 1938 |